No. 896,132. PATENTED AUG. 18, 1908.
W. J. MASON.
NUT LOCK.
APPLICATION FILED NOV. 27, 1907.

WITNESSES
Edwin L. Bradford
Ralph Wormelle

INVENTOR
William Joseph Mason
By Robt. D. Johnston Jr.
Attorney

UNITED STATES PATENT OFFICE.

WILLIAM JOSEPH MASON, OF DAPHNE, ALABAMA.

NUT-LOCK.

No. 896,132.   Specification of Letters Patent.   Patented Aug. 18, 1908.

Application filed November 27, 1907. Serial No. 404,115.

*To all whom it may concern:*

Be it known that I, WILLIAM JOSEPH MASON, a citizen of the United States, residing at Daphne, in the county of Baldwin and State of Alabama, have invented new and useful Improvements in Nut-Locks, of which the following is a specification.

My invention relates to an improvement in nut locks and has for its object to provide a nut recessed preferably, in its inner face, to receive an internal spring locking detent which is adapted to engage in a longitudinal groove formed in the threaded end of the bolt.

A further object is to secure the integral spring locking detent in the recess in the nut without the use of any part, such as a pin, set screw, etc., which is liable to work loose, and to this end I place the inner end of the spring member between contiguous walls of the recess which are intended to be struck with a tool and distorted so that they engage and positively lock the spring member in place between them.

A further distinct object of my invention is to place the locking detent in a recess in the inner face of the nut and provide it with a catch or equivalent means to hold it out of engagement with the grooves and the bolt. This completely protects the locking detent and prevents its loss or displacement.

My invention involves other details of construction such as are more fully disclosed in the accompanying drawings which form a part of this specification, and in which:—

Figure 1:
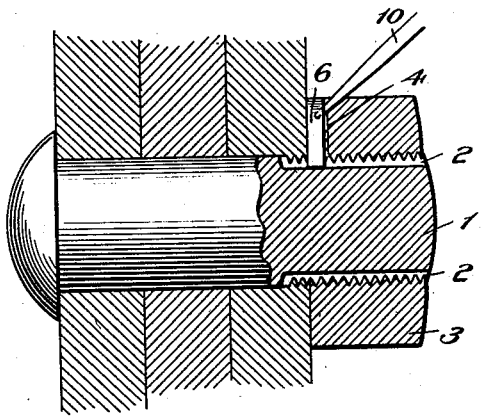
Figure 2:
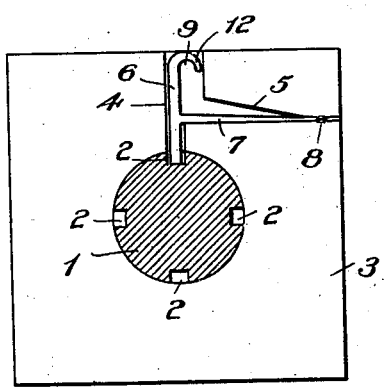
Figure 3:
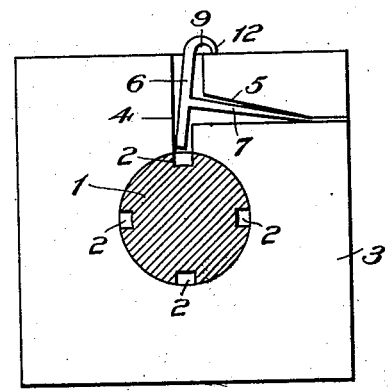
Figure 4:
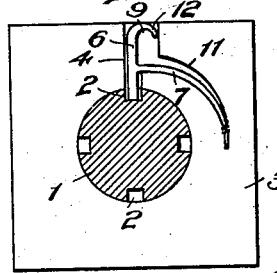

Figure 1, is a vertical longitudinal sectional view through the nut and grooved end of the bolt showing the detent in locking position. Fig. 2, is a view looking at the inner face of the nut with the detent in locking position. Fig. 3, is a similar view of Fig. 2, showing the detent disengaged, the spring, in its view being detachably held in its recess. Fig. 4, is a modification of my improved nut lock adapted for use with smaller nuts and showing the spring and its groove curved.

Similar reference numerals refer to similar parts throughout the drawings.

According to my invention as illustrated, I provide a bolt 1 with one or more longitudinal grooves 2 which extend throughout its threaded portion. I provide a nut 3 of ordinary construction, except that in its inner face I stamp or otherwise form a groove or recess to receive the locking detent. This recess comprises a groove 4 which leads inwardly from the outer edge of the inner face of the bolt into the central circular bolt opening. From an intermediate point at one side a straight tapering recess 5 leads to the outer edge of the nut and terminates in a tapering point. The locking means for the nut comprise a head or detent 6 which moves in the groove 4, and integral with or rigidly secured to this detent is a straight spring retaining member 7, the outer end of which extends into the tapered end of the recess 5 and is secured therein at the point 8 by calking or deflecting the side walls of the recess over and into engagement therewith by means of any suitable instrument. The spring member 7 as thus held in the recess 5 tends to hug the inner wall thereof adjacent to the bolt opening and to force the detent 6 into the bolt opening. At the outer end of the detent I bend it to form a loop 9 to receive the tool, such as 10, by means of which the detent may be sprung or lifted out of engagement with the bolt. As seen in Fig. 2, the detent when in locking position has no portion which projects beyond the nut and is therefore absolutely safe against displacement or injury.

As it will be desirable while the nut is being screwed on or off to hold it clear of the bolt, I adapt the curved end of the detent facing towards the spring to form a catch 12 which, after the detent has been lifted to the position shown in Fig. 3, by means of the tool 10, will spring over the side of the nut and serve to hold the detent clear of the bolt so that the nut can be screwed or unscrewed with the same ease as ordinary nuts. It will be noted that the spring will tend to hold the loop against the wall of the groove next to the spring so that the loop will spring over the top of the nut as soon as it clears the upper edge of the groove.

Where the nut is small in order to give a greater length of spring, I provide the construction shown in Fig. 4, wherein the recess 11, corresponding to the recess 5, is shown curved or half moon shaped so that it extends around the bolt opening. In this case the spring member 7 is also curved to conform to the curvature of the recess 11.

To further decrease cost of construction the spring may be inserted in the recesses 5 or 11 without being calked therein, it being obvious that the locking detent can be readily slipped into its retaining recess and when once in place will be held between the nut and its work. The shape of the recess is such as to engage the spring and cause it to act in the manner above described without its being rigidly secured therein.

Having thus described my invention, what I claim as new and desire to secure by Letters Patent, is:—

1. In combination with a recessed bolt, of a nut having intersecting slots at angles to each other, and a locking member having a spring shank projecting intermediately from the same, the free end of the shank secured in one of the slots, one terminal of the said member being disposed to engage the recess of the bolt and the opposite terminal thereof formed with a hook to catch over the marginal wall around the outlet portion of one of the slots in the nut.

2. In combination with a slotted bolt, of a nut having intersecting recesses within marginal edges of the inner face thereof, one of the recesses forming a mouth portion, a spring locking member normally seated in the recesses, and a hook on one terminal of said member to automatically engage the wall of said nut adjacent the mouth portion to hold said member disengaged from the slot in the bolt.

In testimony whereof I have hereunto set my hand in presence of two subscribing witnesses.

WILLIAM JOSEPH MASON.

Witnesses:
GUSTAVE M. HOLMAN,
ROBERT F. FOXWORTH.